(12) United States Patent
Rivere

(10) Patent No.: US 9,818,074 B2
(45) Date of Patent: Nov. 14, 2017

(54) METHOD AND SYSTEM TO ANALYZE TIME STAMP LOCATION DATA TO PRODUCE MOVEMENT AND IDLE SEGMENTS

(71) Applicant: MobiWork, LLC, Delray Beach, FL (US)

(72) Inventor: Herve Rivere, Delray Beach, FL (US)

(73) Assignee: Mobiwork, LLC, Delray Beach, FL (US)

( * ) Notice: Subject to any disclaimer, the term of this patent is extended or adjusted under 35 U.S.C. 154(b) by 0 days.

(21) Appl. No.: 13/649,753

(22) Filed: Oct. 11, 2012

(65) Prior Publication Data

US 2013/0090966 A1    Apr. 11, 2013

Related U.S. Application Data

(60) Provisional application No. 61/545,957, filed on Oct. 11, 2011.

(51) Int. Cl.
*G06Q 10/00* (2012.01)
*G06Q 10/06* (2012.01)
*G06Q 10/08* (2012.01)

(52) U.S. Cl.
CPC .    *G06Q 10/06311* (2013.01); *G06Q 10/06316* (2013.01); *G06Q 10/087* (2013.01)

(58) Field of Classification Search
CPC ........ G06Q 10/00; G06Q 10/06; G06Q 40/00; G06Q 40/06; G06F 17/60
USPC ....................................................... 705/7.15
See application file for complete search history.

(56) References Cited

U.S. PATENT DOCUMENTS

| | | |
|---|---|---|
| 4,009,375 A | 2/1977 | White et al. |
| 4,891,650 A | 1/1990 | Sheffer |
| 5,182,705 A | 1/1993 | Burr et al. |
| 5,458,123 A | 10/1995 | Unger |
| 5,552,772 A | 9/1996 | Janky et al. |
| 5,561,706 A | 10/1996 | Fenner |
| 5,652,570 A | 7/1997 | Lepkofker |

(Continued)

OTHER PUBLICATIONS

U.S. Appl. No. 13/649,693, filed Oct. 11, 2012, Real Time Customer Access to Location, Arrival and on-Site Time Data.

(Continued)

*Primary Examiner* — Romain Jeanty
(74) *Attorney, Agent, or Firm* — Robert C. Kain, Jr.

(57) ABSTRACT

The method converts GPS signals from a GPS-enabled phone-tablet-device into time-on-site data. A database includes unique task data and data on task person (T-P), task situs, time-on-site, and assignment. Server determines when the GPS is in an idle mode defined by a territory about a current GPS data by a threshold or other algorithm. Processor determines whether the GPS moves by applying an "idle to movement" algorithm, movement by positional data or velocity and "movement to idle." A time-on-site is determined when idle ON and current-GPS matches task situs. Method transforms GPS data into travel time indicator data and time-on-site data for quality assurance, billing and accounting. The method automatically identifies and divides the movements of a person or apparatus into types of actions (including the non-action, idle mode). The method analyzes, identifies and divides it into sequential segments.

15 Claims, 14 Drawing Sheets

(56) References Cited

U.S. PATENT DOCUMENTS

| | | |
|---|---|---|
| 5,712,899 A | 1/1998 | Pace, II |
| 5,734,706 A | 3/1998 | Windsor et al. |
| 5,734,837 A | 3/1998 | Flores et al. |
| 5,754,857 A | 5/1998 | Gadol |
| 5,936,572 A | 8/1999 | Loomis et al. |
| 6,098,048 A | 8/2000 | Dashefsky et al. |
| 6,154,727 A | 11/2000 | Karp et al. |
| 6,202,023 B1 | 3/2001 | Hancock et al. |
| 6,295,513 B1 | 9/2001 | Thackston |
| 6,415,284 B1 | 7/2002 | D'Souza et al. |
| 6,509,830 B1 | 1/2003 | Elliott |
| 6,553,407 B1 | 4/2003 | Ouchi |
| 6,615,184 B1 | 9/2003 | Hicks |
| 6,687,609 B2 | 2/2004 | Hsiao et al. |
| 6,731,238 B2 | 5/2004 | Johnson |
| 7,051,273 B1 | 5/2006 | Holt et al. |
| 7,102,510 B2 | 9/2006 | Boling et al. |
| 7,142,892 B2 | 11/2006 | Dennis et al. |
| 7,155,519 B2 | 12/2006 | Lo et al. |
| 7,206,568 B2 | 4/2007 | Sudit |
| 7,246,746 B2 | 7/2007 | McNamara et al. |
| 7,249,045 B2 | 7/2007 | Lauffer |
| 7,372,365 B2 | 5/2008 | Jackson |
| 7,688,185 B1 | 3/2010 | McKethan |
| 7,756,293 B2 | 7/2010 | Kuwabara et al. |
| 8,548,734 B2 * | 10/2013 | Barbeau et al. ............... 701/411 |
| 2004/0267595 A1 | 12/2004 | Woodings et al. |
| 2005/0021428 A1 | 1/2005 | Costello |
| 2005/0202830 A1 | 9/2005 | Sudit |
| 2005/0202831 A1 | 9/2005 | Sudit |
| 2005/0202832 A1 | 9/2005 | Sudit |
| 2005/0202834 A1 | 9/2005 | Sudit |
| 2006/0022048 A1 | 2/2006 | Johnson |
| 2006/0055536 A1 * | 3/2006 | Jackson ..................... 340/572.1 |
| 2006/0126620 A1 | 6/2006 | Bonar et al. |
| 2006/0206370 A1 | 9/2006 | Skopal |
| 2006/0258370 A1 | 11/2006 | Sudit et al. |
| 2007/0060171 A1 | 3/2007 | Sudit et al. |
| 2007/0162537 A1 | 7/2007 | Juncker |
| 2007/0264974 A1 * | 11/2007 | Frank et al. .................. 455/411 |
| 2007/0282479 A1 | 12/2007 | Shibuya et al. |
| 2007/0282722 A1 | 12/2007 | Ducolon et al. |
| 2007/0287473 A1 | 12/2007 | Dupray |
| 2008/0014964 A1 | 1/2008 | Sudit et al. |
| 2008/0052346 A1 | 2/2008 | Basset et al. |
| 2008/0091498 A1 | 4/2008 | Chiverton et al. |
| 2008/0171559 A1 * | 7/2008 | Frank et al. ............... 455/456.5 |
| 2010/0069035 A1 | 3/2010 | Johnson |
| 2010/0076898 A1 | 3/2010 | Beshears et al. |
| 2012/0203589 A1 | 8/2012 | Eggena et al. |

OTHER PUBLICATIONS

U.S. Appl. No. 13/649,714, filed Oct. 11, 2012, Method and System to Record and Visualize Type, Time and Duration of Moving and Idle Segments.

U.S. Appl. No. 13/649,876, filed Oct. 11, 2012, Method and System to Define Implement and Enforce Workflow of a Mobile Workforce.

U.S. Appl. No. 13/649,737, filed Oct. 11, 2012, Method and System to Record and Visualize Type, Path and Location of Moving and Idle Segments.

U.S. Appl. No. 13/649,753, filed Oct. 11, 2012, Method and System to Analyze Time Stamp Location Data to Produce Movement and Idle Segments.

U.S. Appl. No. 13/649,773, filed Oct. 11, 2012, Time on Site and Point of Interest Tracker with Privacy Block.

* cited by examiner

FIG. 2A

Activities Today

| Title | User | Time | Work Order (WO) - Task | Customer | Action |
|---|---|---|---|---|---|
|  |  |  |  |  |  |
|  |  |  |  |  |  |

FIG. 2B

Customers

| Name | Address | Primary Contact | Actions |
|---|---|---|---|
|  |  |  |  |
|  |  |  |  |

FIG. 2C

Work Orders

| File Type | Customer | Location | Status | Date-Time | Assigned to Task Person | Confirm | Action |
|---|---|---|---|---|---|---|---|
|  |  |  |  |  |  |  |  |
|  |  |  |  |  |  |  |  |

FIG. 2D

Equipment

| Type | Ser. No. | Work Order | Customer Name | Action |
|---|---|---|---|---|
|  |  |  |  |  |
|  |  |  |  |  |

FIG. 2E

Work Order Reports

| Customer | |
|---|---|
| Equipment Ser. No. | |
| Creation Date From | |
| Creation Date to | |
| Report Format | fnc. Sel.: Excel, QuatroPro, Word |
| Create Report | fnc: YES |

FIG. 2F

Balance Sheet

| Customer | |
|---|---|
| fnc: create report | YES |

FIG. 2G

Tasks

| File type | ID | Status | Category | Description | Date | Action | Status |
|---|---|---|---|---|---|---|---|
| | | | | | | | |
| | | | | | | | |

FIG. 2H

Users

| Login ID | Name | Status | Action |
|---|---|---|---|
| | | | |
| | | | |

FIG. 2I

Partners

| Name | Co. Name | Ph No. | Email | Status | Action |
|------|----------|--------|-------|--------|--------|
|      |          |        |       |        |        |
|      |          |        |       |        |        |

FIG. 2J

Devices

| Make | Model | User Name | Last Update time | Action |
|------|-------|-----------|------------------|--------|
|      |       |           |                  |        |
|      |       |           |                  |        |

FIG. 2K

Products

| Id | Name | SKU# | Price | Quantity | Actions |
|----|------|------|-------|----------|---------|
|    |      |      |       |          |         |
|    |      |      |       |          |         |

FIG. 3A
Configured Table - Initial Screen (includes new notifications, new WOs, Wos)

New Notifications

| Type | ID | Date | Description | fnc: View (V) | fnc: Accept (ACC) | fnc: delete (DEL) |
|---|---|---|---|---|---|---|
| alarm | 123 | 10.10.2011 | low batty | user select | u-sel | u-sel |
| alarm | 564 | 10.10.2011 | confirm telecom | u-sel | u-sel | u-sel |
| | | | | | | |

New/Unassigned Work Orders ("WO")

| ID/Title | Customer/Loc | Status | Date | Action |
|---|---|---|---|---|
| 34 (WO 034) | John Bee 900 S. Terrace Miami, FL 123A | open | 10.15.2011 | fnc: V, ACC, DEL |
| more | etc | etc | | |
| | | | | X-Table Fnc: pg. 2, pg. 3, etc. |

Assigned Work Orders (no. WO's)

| ID/Title | Customer/Loc | Status | Date | Assigned to | Confirm | Action |
|---|---|---|---|---|---|---|
| 34 (WO 034) | John Bee 900 S. Terrace Miami, FL 123A | open | 10.15.2011 | Dean Smith, Ph: 345-3-260 | pending (Alt: YES, NO) | fnc: V, ACC, DEL |
| more | etc | etc | | | | |
| | | | | | | XT-fnc: pg. 2, 3, 4 |

Activities Today

| Title | User | Time | WO/Task | Customer | Actions |
|---|---|---|---|---|---|
| | | | | | fnc: V, ACC, DEL |
| | | | | | XT-fnc: pg. 2, 3, 4 |

FIG. 3B

Configured Table - New Notifications

| Alarm 123 | | | |
|---|---|---|---|
| Message | data | Status | data (ack, pend, NO) |
| Acknowledge day | date data | Create date | data |
| Acknowledge who | person data | Close date | data |
| System alarm (criticality) | critical data type | Closed by who | person data |

FIG. 3C

Configured Table - Assigned Work Orders (WO) - Main Menu

| Menu Fnc: | Summary | Equip | Notes | Docs | Forms | Activity | Bills | History |
|---|---|---|---|---|---|---|---|---|
| Status | Assigned: Y, N, pending | | | | Confirm Status | | pend, not assigned | |
| Created | date data | | | | | | Misc. Fnc: Input | |
| Customer | name | | addr. | | Ph. No. | | See More Data | |
| Location | data | | addr. | | Ph. No. | | Mark Critical | |
| Assigned to | person data | | email | | ph. No. | | Ack Done | |
| Appointment | appt. data | | travel time (est) | | time-on-site (est) | | Add Data Input | |
| Est. Duration | time span data | | travel time (actual) | | time-on-site (actual) | | | |

FIG. 3D

Configured Table - Assigned Work Orders (WO) - Equipment Table

| Menu Fnc: | Summary | Equip | Notes | Docs | Forms | Activity | Bills | History |
|---|---|---|---|---|---|---|---|---|
| Equipment Type | Problem Descript. | | Resolution | | Actions | | Fnc. | |
| Data | data | | data | | | | | |

FIG. 3E

Configured Table - Assigned Work Orders (WO) - Notes Table

| Menu Fnc: | Summary | Equip | Notes | Docs | Forms | Activity | Bills | History |
|---|---|---|---|---|---|---|---|---|
| Notes | Date | | User-pull down list: Task Person, Mgr., Sys Op., etc. | | | Visible by Customer | Actions | |
| data | data | | | | | YES/NO | Fnc. | |

FIG. 3F

Configured Table - Assigned Work Orders (WO) - DocumentTable

| Menu Fnc: | Summary | Equip | Notes | Docs | Forms | Activity | Bills | History |
|---|---|---|---|---|---|---|---|---|
| User List sel | Date | | Type | | Doc Name | Comment | Action - fnc. | |
| Data | data | | etc. | | | | | |

FIG. 3G

Configured Table - Assigned Work Orders (WO) - Form Table

| Menu Fnc: | Summary | Equip | Notes | Docs | Forms | Activity | Bills | History |
|---|---|---|---|---|---|---|---|---|

Data Processing Note: Convert Customer Form into Data Entry Forms

FIG. 3H

Configured Table - Assigned Work Orders (WO) - Activity Table

| Menu Fnc: | Summary | Equip | Notes | Docs | Forms | Activity | Bills | History |
|---|---|---|---|---|---|---|---|---|
| User | Date | | Time | | Duration | | Action | |
| | | | | | | | fnc. | |

FIG. 3I

Configured Table - Assigned Work Orders (WO) - Bills Table

| Menu Fnc: | Summary | Equip | Notes | Docs | Forms | Activity | Bills | History |
|---|---|---|---|---|---|---|---|---|
| Type | Name-descript | Price | Quantity | Rebate | Tax | Total | Action: fnc. | |
| Data | data | etc | | | | | | |
| | | | | | | | | |
| BALANCE | | | | | | | | |
| | | data | invoice no. | amt. bill | amt. Cr. | Bal. | | |

FIG. 3J

Configured Table - Assigned Work Orders (WO) - History Table

| Menu Fnc: | Summary | Equip | Notes | Docs | Forms | Activity | Bills | History |
|---|---|---|---|---|---|---|---|---|
| date/time | | Activity type | | | descript | | user | |
| data | | | | | | | | |

FIG. 3K

Configured Tables - Main Menu - Top Level Selections

| Main Menu Sel: | Home | Customers | Work Orders | Tasks | Activity | Account | Help |
|---|---|---|---|---|---|---|---|
| sub-menus | | | Work Orders | Tasks | Schedules | See below | |
| | | | Equip | Reports | Notifications (s-2d) | | |
| | | | Reports (sub-2d) | | Locations (s-2d) | | |
| | | | | | Reports (s-2d) | | |

Account Sub menus: Users, Partners, Devices, Products, Settings, My Settings, Admin
Reports Sub-2d ("s-2d"): Work Orders; Balance Sheet
Notification Sub-2d: Notifications, Messages, Alarms
Locations Sub-2d: Last Known, Task Person Time Sheet; Task Person Geo Path
Reports Sub-2d: Activity Report

FIG. 3L
Configured Tables - Activity - Schedule

Fnc: Daily Sel.; Monthly Sel; etc.
    Fnc.: Select User
    Fnc.: Select all users by group
    Fnc.: Select User y Smart Phone Device
    Fnc.: sel. geo. device or group geo. device Display Daily Calendar as per user selection (U-sel)

| Time Block | Person A | Person B | Person C |
|---|---|---|---|
| 8:00AM1 | xx | xx | xx |
| 8:30AM | | | |
| 9:00AM | | xx | xx |
| etc. | | | |

FIG. 3M

Configured Tables - Activity - Notifications

Fnc:  Daily Sel.; Monthly Sel; etc.
      Fnc.: Select User
      Fnc.: Select all users by group
      Fnc.: Select User by Smart Phone Device
      Fnc.: sel. geo. device or group geo. device Display Daily Calendar

| Time Block | Person A | Person B | Person C |
|---|---|---|---|
| 8:00AM | | | |
| 8:30AM | xx | | |
| 9:00AM | | | xx |
| etc. | | | |

FIG. 3N

Configured Tables - Activity - Location - Last Known

Display Geo Map with Location Pointer ("Loc. Ptr.")
      Fnc.: Show all smart phones in group
      Fnc.: Select User with Smart Phone
      Fnc.: sel. geo. device or group of geo. devices DISPLAY GOOGLE MAP HERE with loc. Ptr(s).

FIG. 3O

Configured Tables - Activity - Location - Timesheet Tracker

Fnc: Daily Sel.; Monthly Sel; etc.
      Fnc.: Select User and user assigned devices
      Fnc.: Select all users by group
      Fnc.: Select Smart Phone Device or group or smart phones
      Fnc.: sel. geo. device or group geo. device Display Daily Calendar

| Time Block | Task Person A | Task Person Smart Phone | Task Person Comp. Tablet |
|---|---|---|---|
| 8:00AM | data | data | data |
| 8:30AM | | | xxx |
| 9:00 | ccc | ccc | |
| etc. | | | |

FIG. 3P

Configured Tables - Activity - Location - Geo Tracker

Display Geo Map with Location Pointer (:Loc. Ptr.")
    Fnc.: Show all smart phones in group
    Fnc.: Select User with Smart Phone
    Fnc.: Select all users in a group
    Fnc.: sel. geo. device or group of geo. devices DISPLAY GOOGLE MAP HERE with loc. ptr(s)

| Critical Marker/ Type | Status | Time - start time and time on site | Approx. - distance |
| --- | --- | --- | --- |
| data | idle, moving, out of range | data | data |
|  | Total | data | data |

FIG. 3Q

Configured Tables - Activity - Reports

Activity Id
User (select pull down menu)
Customer
From: day input or display "select calendar"
To: day input or display "select calendar"

FIG. 3R

Configured Tables - Account - All Submenus

Account Sub menu: Users, Partners, Devices, Settings, My Settings, Admin
Data processing note: Common configuration tables, customizable, extendable

METHOD AND SYSTEM TO ANALYZE TIME STAMP LOCATION DATA TO PRODUCE MOVEMENT AND IDLE SEGMENTS

This a regular patent application based upon and claiming the benefit of provisional patent application Ser. No. 61/545,957, filed Oct. 11, 2011, the contents of which is incorporated herein are referenced thereto.

The present invention relates to a system, a method and a computer program to analyze time stamp location data or GPS signal data from a GPS-enabled cellular, tablet computer or other electronic device in order to produce movement and idle segments for the task person (user) utilizing the GPS-enabled device. The systems converts and transforms a series of GPS signals and signal data into time-on-site indicator data.

BACKGROUND OF THE INVENTION

It is well known that service men and women and sales persons who visit customer locations throughout a wide geographic territory are oftentimes delayed in meeting appointment times. These appointment times are set, in advance to provide service, repair and goods to the customer at the customer location or site or to engage the customer in conversations and demonstrations in an effort to sell goods or services to the customer. With the advent of GPS-enabled electronic devices (cellular telephones, smart phones, tablet computers and other devices having GPS-enabled circuitry), it is easier for the person assigned to the task (the service man or salesman) to locate the customer. However, a problem still exists if a number of customers are scheduled for a single day or if the task person must visit other stores or locations to collect additional service personnel or equipment or supplies (vendor locations) in order to complete the task at the customer's location.

Databases and spreadsheets (a spreadsheet being a two dimensional database) have been developed to provide customer service and improve customer relations through the use of computer programs and computer systems. Notwithstanding these tools, business have experienced difficulty in monitoring mobile work forces and sales forces which need to visit the customer site to close a sale or repair equipment or provide other services at the customer's location. The present system and method seeks to solve problems associated with a mobile workforce.

Many systems have been implemented for determining a geographic location and other parameters, of a device associated with persons, things, or apparatus at a given time. Conventional systems are typically designed to report those raw locations as such without further analysis most notably as to what the actual movement segments are (moving, idle, etc.).

There is a need for a reliable and automated method to identify the corresponding movement segments and idle segments.

OBJECTS OF THE INVENTION

It is an object of the present invention to provide a comprehensive mobile work force solution that improves work force capability, productivity and visibility as well as improve the quality of the customer experience.

The present system exploits the GPS features of a smart cellular telephone or a tablet computer with a web based platform which enables management and assigned task personnel to track, locate, capture data, and record events both automatically and manually to provide service to the business' customer.

It is another object of the present invention to provide an integrated platform for customers, work orders, tasks activities and parts and products inventory management and integrate smart phone features such as real time communication, location, navigation, audio information, image data, signature data and payment processing directly to the user's and customer's location.

Other objectives and advantages of the present invention are discussed later herein.

BRIEF DESCRIPTION OF THE DRAWINGS

Further objects and advantages of the present invention can be found in the detailed description of the preferred embodiments when taken in conjunction with the accompanying drawings in which:

FIGS. 2A-2K diagrammatically illustrate tables with database fields or spreadsheet fields for one embodiment of the invention.

FIGS. 3A-3R diagrammatically illustrate configured tables for another implementation of the present invention.

SUMMARY OF THE INVENTION

Figure 1:
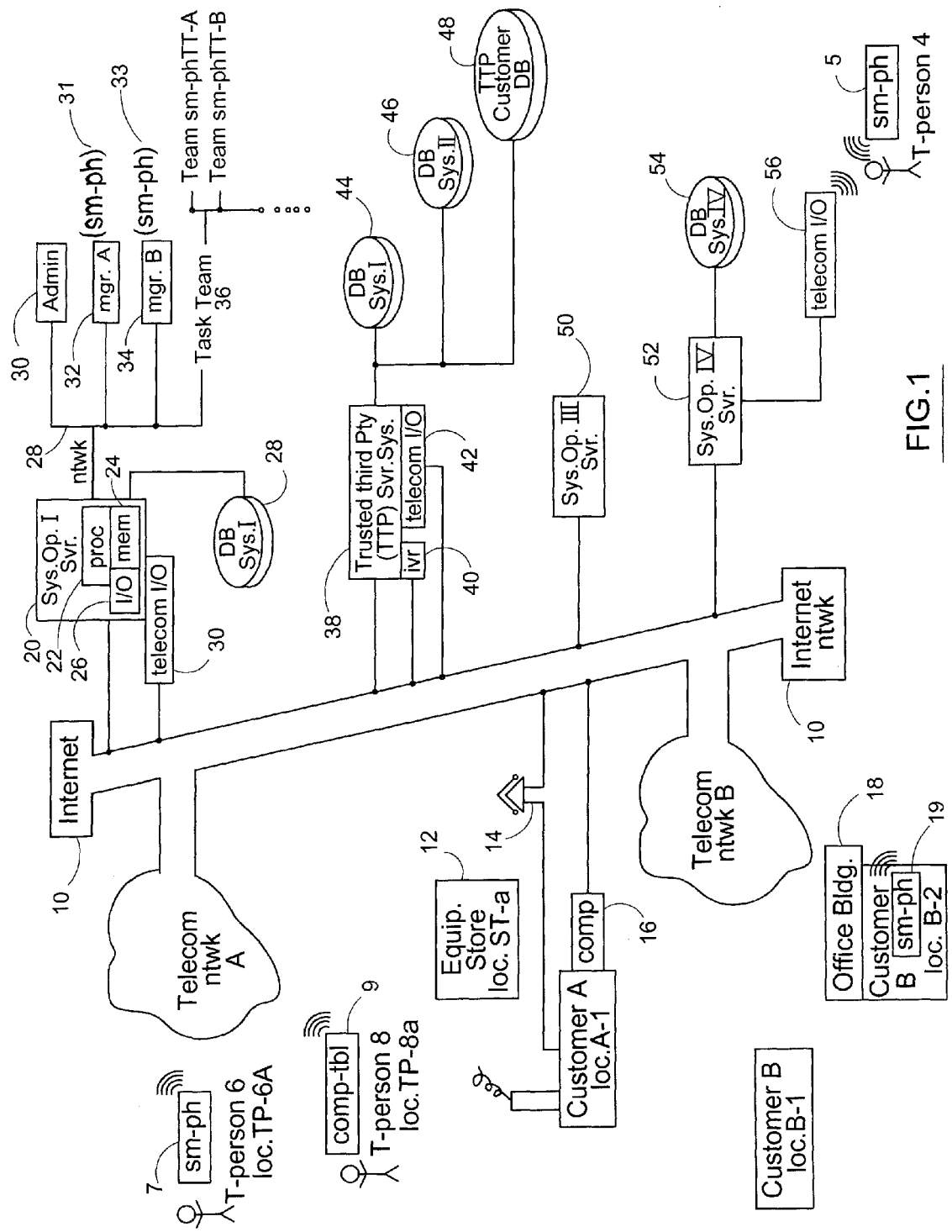
FIG. 1 diagrammatically illustrates a system diagram of the invention and various configurations of the method over a distributed computer system.

The computer based system and method converts a GPS signal from a GPS-enabled cellular telephone, tablet computer or electronic device (herein a "GPS-enabled device") into time-on-site indicator data. The system utilizes a database populated by a plurality of tasks represented by unique task data collections and task person data. Each one of the task data collections has a task situs location data, time on site data or data field, task identifier data, task description and task assignment data. Some of these data fields are blank until populated by data generated by the system herein. The task person data represents at least contact data for that task person, that is, the person assigned to perform the task at the customer location. The database is coupled and operable with a web based processor. The web based processor is coupled to a telecommunications network. The GPS-enabled device is also coupled to the telecommunications network. The system and the method periodically gathers GPS time stamp location data from the GPS-enabled device. That device is carried by the task person assigned to execute or complete the unique task. The GPS data is obtained via a web based communication channel operating by a web base interface on the server.

The server determines when the GPS-enabled device is in an idle mode defined by a territory about a present or contemporaneously acquired GPS data. The idle mode is effectively determined by monitoring a distance threshold. The web based processor further determines whether the GPS-enabled device moves by applying an "idle to movement" algorithm which compares one or both of a series of earlier positions and the velocity of movement. The server further determines whether the GPS-enabled device is in a "movement" mode by monitoring one or more of a distance traveled over a predetermined time period, a velocity at predetermined time intervals or a change in velocity. Additionally, the server determines whether the GPS-enabled device moves by application of a "movement to idle" algorithm by comparing one or both of a recently acquired series of earlier positions or the recently resulting velocity of movement.

The server calculates a "time on site" value and indicator data when the idle mode is ON and the then-current GPS location data matches the task situs location data until the next "movement" mode is detected. The idle module is always active and catches any idle situation, without regard to whether the current GPS data matches the task situs. The method and system further provides a transformation of GPS signal data into travel time indicator data and time on site indicator data. The time on site indicator data can be used for quality assurance purposes, in determining whether to increase or decrease billing practices for that particular task, to determine the effectiveness and completion of a task by the task person, and to provide a documentable basis for billing the customer for the goods or services delivered to the customer's location.

The method automatically identifies and divides the movements of a person, thing, or apparatus associated with a GPS-enabled device that records the corresponding geographical locations and time stamps. Regardless of how they are captured and recorded (in real-time or not), the set of geographical locations is represented as a set of time stamped latitude and longitude values (altitude, horizontal and vertical accuracy are also typically available). The method analyses this set to identify and divide it in a set of sequential segments for each movement (Idle, Idle to Moving, Moving, Moving to Idle, and Idle). Each segment has a start time, a stop time, a duration and a distance (if applicable) associated with it in addition to the corresponding type of movement. The method is an iterative and retroactive process for each new location: (1) Qualification: Making sure the location is valid (e.g. compute distance and corresponding speed, check the horizontal and vertical accuracy). (2) Analysis: Compare location with previous location(s) and previous segment(s). (3) Retroactive analysis: Apply update(s) to the previous segment(s). For instance, replacing "Moving~Moving to Idle~Moving" segments by a unique "Moving" segment (e.g. when a persons stops at a red light). This retroactive re-classification of data more fairly represents the condition of the task person in the mobile workforce. The customer (as well as the task person or other registered user) may access the system via an ap (an access point) from a smart phone or via a voice telecommunications channel wherein the system employs an interactive voice response (IVR) module for the communication.

DETAILED DESCRIPTION OF THE PREFERRED EMBODIMENTS

The present invention relates to a method and a system to analyze time stamp location data and to produce movement and idle data segments which are utilized to provide time on site indicator data. Similar numerals designate similar items throughout the patent specification. Some abbreviations in the drawings and the patent specification are identified in the Abbreviations Table at the end of the specification.

Basic System Description and Advantages

The system provides a comprehensive mobile workforce solution that improves workforce capability, productivity and visibility as well as the quality of the customer experience.

The system employs advanced software components, modules and data acquisition and processing methods which exploit the unique smartphone and computer tablet capabilities and a web-based platform enabling management and assigned task personnel to track, locate, capture data and record events both automatically and manually, thereby providing better service to the system operator's customers.

Customers, work orders, tasks, activities, parts/products and inventory management, forms, workflow automation, messaging and all the capabilities the smartphone brings (real-time communication, location, navigation, audio, image, signature, and payments) are seamlessly integrated into a series of user-friendly interfaces to empower the mobile workforce and provide a superior customer experience.

The system operator employs a web browser which is enabled at different levels of control for the front office, the back office, the assigned task person, task team members, management, and, to a limited extent to customers. These customizable interfaces provide real time results and time-and-location based planning and task execution. From the customer's view, he or she can now see the time-to-arrival and any impediments blocking the access to service, repair or sales call by viewing the customer portal.

The system uses smartphone capabilities (real-time communication, location, navigation, audio, image, signature, and payments)(also available from GPS enabled computer tablets and other GPS and telecom enabled devices) and integrates data from those devices with data from the front office, the back office, the task person, team members and management, and presents the same in an orderly fashion to the authorized party.

The system is suited for field services as well as other businesses that employ a fleet of mobile workers who execute activities outside of the office, such as sales, business development and customer service.

Application functionality and corresponding benefits are designed for mobile workers, managers, office coordinators and customers.

The GPS enabled cellphone, computer tablet or other electronic device with a telecom link is loaded with native applications that securely communicate over the Internet with the system operator servers, delivering inbound and outbound messages to track, exchange information and manage activities Office coordinators and management log in to web portals to create and update customer data, work orders, tasks, establish appointments, send notifications and access reports. The system is an extension of the system operator's customer relationship management (CRM) system and enterprise relationship program (ERP) enabling the system operator to extend its existing platform to the mobile world.

Customers are provided with access to a secure web portal to review appointments, create new orders and track workers on a time-based format and a geo location format. The system can be further integrated with interactive voice recognition (IVR) features to provide an audio phone based interface for customers.

The system improves workforce capability, productivity and visibility, which translates to cost and time savings, increased revenues and peace of mind. The system permits the system operator to configure a unique customer access portal to view a wide range of task person data (time to customer location, current location, estimated impediments, customer enabled input to add or alter customer contact data (home phone to cell phone to business phone). Accordingly, the customer is provided with more transparency and visibility, which results in a far superior customer experience and a competitive advantage.

Data acquisition and data processing modules are integrated together to provide a seamless and intuitive user interface at various control levels.

Customer Management Module (system operator ("Sys Op") controlled): Customers (including prospects), contacts, locations, custom forms, notes, history, appointments, customer relationship details such as previous work orders, documents, billing, invoices and payments, customizable processing rules, bulk provisioning, and reports.

Work Order Management Module: Drag and drop appointment scheduling, automated route planning (based on schedules, locations) and optimization, automated creation based on rules (service contracts), location based directions and navigation, notes, invoicing and payments, history, customer relationship details such as previous work orders, products/parts and inventory management, documents (audio, images), custom forms, signature capture, customizable processing rules, and reports.

Task Management Module: Drag and drop ordering, list management, expected completion dates and automated reminders, resource assignment, categories, access control, location based directions and navigation, documents (e.g. audio, images), customizable processing rules, and reports.

Activity Management Module: Drag and drop management of appointments, work orders and task scheduling, with real times updates to both office and mobile workers, automated time and travel tracking and billing with real location data (e.g. expense reports management), automated mobile worker location and movement tracking, time-on-site analysis, plan versus actual metrics for analysis and optimization.

Notifications (including emergencies and high risk situations) Module: Send/Receive alarms, messages, automated notifications reminders whenever attention is required. In case of an emergency, the task person—mobile worker can notify the Sys Op in two (2) clicks on the smart phone that the task person needs immediate and urgent help. In high risk working conditions, the automated watchdog mechanism immediately notifies the Sys Op if a mobile worker is not responding.

Account Management Module (web only designed for office): Extensive workflow automation framework (rules, filters, actions) to automatically exploit all the underlying information (e.g. automatically determining that a mobile worker is going to be late for an appointment), forms definition (including subforms and dynamic number of items), extensive set of customization parameters (including custom print views for forms, invoices and work orders), access control roles/permissions (template based as well as custom, individual and/or group of users), plus automated inventory.

The system and method is smartphone and GPS-enabled tablet based. There is no need for custom hardware to be installed on a vehicle, and no need for mobile workers to carry a costly, bulky and slow laptop.

The system is platform agnostic in that the system works on GPS-enables cell phone such as: BlackBerry™, Android™ (Apple, Microsoft on roadmap), and iPhone™ and iPad™.

The system is carrier agnostic and works on any telecom carrier (e.g. AT&T, Verizon, T-Mobile, Sprint, VodaFone).

The system is customizable by the Sys Op for any particular business or service. The system uses XML based APIs to interface with 3rd party software.

Smart Device Integration Features

The system and method exploits the software and hardware capabilities provided by the GPS-enabled smart electronic devices linked into the telecom system. The integrated features include: Navigation system including audio driving directions; Signature capture; Image capture; Audio capture; Video capture; Location capture; 1D and 2D (QR codes) bar codes capture; and Payment capture (including NFC when available)(near field communication payment systems).

Examples of these uses of the system are: (A) Delivery Service: Worker uses the system to view his next appointment, clicks on navigation for directions, arrives at the delivery point (location is tracked), scans a 2D code, captures customer signature. (B) Sales: Worker views list of customers/prospects to visit, upon arrival receives custom action checklist, allow customer to use QR code coupon, captures payment and signature. (C) Account Manager: Worker arrives at customer site, updates system database with latest info, adds audio trip report and photo, records video of customer testimonial.

The system and method provides Location Tracking and Movement Analysis.

Component Features such as (i) Advanced location tracking and reporting with multiple operating modes (continuous, business hours, points of interests) for privacy control and/or battery optimization. (ii) Automated movement intelligence including time on site and location-to-point-of-interest matching for idle segments. (iii) Privacy and access control framework to respect and guarantee the privacy of your employees. Integration with System rules engine to enable location & movement triggered actions.

Examples of these uses of the system are: (A) Mobile worker enters or leaves an area which triggers a 'geofencing' activity such as a billing timestamp, or an email alert to a customer when within 5 miles. (B) Mobile worker is leaving appointment, the system triggers a custom "System form" for worker to complete (e.g. appointment report). (C) Automatically track the amount of time spent at each customer by workers and deliver a report to management analyzing face time. (D) Automatically generate an alarm if a device/vehicle is moving at night, if an advertising truck is idle or outside the area it is supposed to be in. (E) Help to retrieve a lost device based on current or last known location. The geo-location tracking and the correspondence with the task situs and the time-on-site factor can all be integrated into a accounting and billing system which is useful to the system operator, manager and customer. In this manner, the system can be configured to send a message at the completion of the task to the manager and the customer. This proof of service feature is beneficial.

The system and method provides Workflow Automation enabled to provide: (i) A rules based framework based on triggers, filters and actions to customize the Sys Op solution to its business needs. (ii) Wireless forms framework. (iii) Notifications and Reminders framework. (iv) Extensive customization support.

Workflow Automation functions include: (A) An "Office" alert and display configured to create a custom form to be displayed on the smart device every Friday at 2:00 PM (time and day trigger) to enable input of a weekly status report. (B)

The system can display a form or checklist when a worker arrives at an appointment. (C) Set a rule for a coordinator/worker/manager to be notified by email or text whenever a mobile worker is going to be late for an appointment. (D) Create a set of rules to detect abnormal conditions such as a vehicle moving at night or outside of a given area, or if a user is idle more than a certain amount of time (e.g. advertising truck).

The system and method provides Activity Scheduling, Tracking and Reporting to provide: (A) Drag and drop scheduling of appointments, work orders & task lists, with real times updates to workers. (B) Planned versus actual visualization and metrics, with the actual automatically created by this system component.

The system and method provides Mobile Planning by creating optimized route to save on fuel costs and limiting delays by finding the most efficient path in terms of mileage and traffic conditions.

The system and method provides privacy and access control framework for the task person.

A mobile worker's (task person's) schedule is updated during the day with a new and an optimized plan of activities, thereby eliminating paper plans and permitting the Sys Op to reduce paper and ink usage and achieve environmental goals.

The system and method provides Activity and Expense reports which can be validated by system audit trails. For example, a manager can receive a report every morning with activity details for entire mobile team: % late, % on site, which customers had access to the task person, face time with customers, and number of customer visits. A consulting services company can automatically track distance and time allocations of all their mobile workers to customers for billing purposes.

The system and method provides a Customer Self Service Portal with the following features. (A) A configurable and customizable web based portal which can be branded as needed by system clients. (B) A 24/7 real time view of work orders, with the ability to update or create new ones. (C) Visibility by customer into worker movement and arrivals. (d) An IVR phone based voice presentation to the customer portal. (D) Notifications via SMS (short message service) or email based on workflow rules. (E) Customer satisfaction monitoring via automated surveys.

The Sys Op decides to enable their customers to view location and estimated arrival time of visiting service worker by logging in to a secure web page, or to request to be notified when the mobile worker is within X predetermined miles of their location. The Sys Op Customer can provide quality related feedback via an online survey in the portal or by email. The Customer is able to order additional services via access to live work orders. This "add services/goods" feature permits the Sys OP, upon the real time request of its customer, to provide additional goods or services to the customer or enable cross selling of goods and services to the customer without requiring live human resource.

The system and method provides a Real Time and Secure Information Exchange with the following features: (A) Optimized for smartphone and limited bandwidth environments. (B) Caching mechanism to enable access to critical data even when the device is out of range. (C) Open set of APIs to enable extension of 3rd party applications such as ERP/CRM to the mobile world. (D) Mobile workers have immediate and real time access to the latest customer information, products, and inventory. (D) Customer profiles can be automatically relayed to the worker's handheld prior to arrival, resulting in a prepared worker and a superior service engagement (or first call resolution rate, or sales close). (E) Mobile workers can remotely update the customer profile, capture critical data from the field, perform form based reporting, execute payment/billing transactions, and any other high-value activity that system has enabled for a smart device.

The system and method provides a wide range of settings for the Sys Op as follows: (A) Global Settings—define the settings that apply to all the users of the company (SMS, customer portal). (B) Payment Options—configure the payment options for work orders (Retainer, Credit Card, PayPal). (C) Rule-based operations—configure system operation. (D) Work Orders ("WOs")—configure work orders (the forms that are attached to a work order, the custom print view). (E) Customers—configure customers (the forms that are attached to a customer, the custom print view). (F) Forms Presentation and Data Input—configure Sys Op forms as data input and output templates. (G) Tasks—configure tasks (categories). (H) Activity—configure the custom activity types. (I) Quick Launch Settings—configure links that appear in the "Quick Launch" panel. (J) User Permissions Templates—configure the user permissions templates that can be assigned to users.

Time-On-Site

The System Time-On-Site module is an automated tracking & reporting solution for organizations that need to analyze the amount of time their workers spend on site, but without infringing on their personal privacy.

The System Time-On-Site tracks the amount of time each worker spends at predetermined locations such as customer or project sites without tracking their personal or professional whereabouts and activities in between. If the Sys Op is interested in tracking and visualizing all movements and locations, the general system operations described above enables that feature.

System Time-On-Site provides automated and concise reports that are sent by email daily and weekly (time, day of the week, date, date range, frequency, destination are all fully customizable). In addition, the reports can be generated for any given time frame or combination of users via the web interface.

System Time-On-Site is a solution that provides key visibility and insight (e.g. which customer was visited and for how long, how long ago was that specific customer location visited and by whom?) while simplifying the day-to-day tasks of the Sys Op mobile workforce (automated activity report, expense report documentation and validation) as well as giving the task person or mobile worker the peace of mind that their privacy rights are secure and respected.

A summary of the Time-On-Site module follows. The GPS enabled smart phone or computer tablet or GPS enabled electronic device, with a telecom link, is carried by the mobile worker. The GPS enabled smart device contains a System Time-On-Site native application that captures the locations of the user—task person and securely communicates that geo location, time and date data to the system's web based servers. On the server side, the Time-On-Site module analyses those locations and computes actual movement versus idle segments. For each idle segment, System Time-On-Site searches from the list of predefined points of interest (for example, customer or partners address or a geographic area defined by a center point and a radius or predefined spatial region about the center point to find a match. If there is a match, the corresponding idle segment is saved and it will be used as part of the reporting. Otherwise, it is discarded.

Office Coordinators and Management automatically receive a daily and weekly summary report by email. These authorized Sys Op persons can also log in to their web portal for real-time access to the geo tracking information or to generate the report for a given time frame and user(s) and Geo-enabled devices.

Additional features of the Time-on-site module include: (i) Associate actions (email, forms to be filled out) whenever the mobile worker enters or leaves a location. (ii) Capture and visualize the entire path of the mobile worker (e.g. to automate and securely generate expense reports). (iii) Capture critical information from the field (payment, signature, audio, images). (iv) Use the system APIs to automatically provision and maintain the Sys Op list of relevant addresses. (v) Add automated surveys to ensure quality of service and get customer feedback.

Details of the General System

FIG. 1 diagrammatically illustrates a system diagram of the present invention. It should be noted that the method and computer system can be located on a singular server controlled and operated by single Sys Op, or, in the alternative, the method and system can be distributed over a plurality of computer systems and networks. FIG. 1 diagrammatically illustrates both a centralized operation of the method as well as a distributed operation of the method.

FIG. 1 shows a task person T-person 6 at location TP-6a. Task person 6 has a smartphone 7 which communicates via a cellular telecommunications network to telecom network A. Telecom network A is connected to internet 10 which in turn is coupled to a plurality of computer systems. Sometimes, the Internet is referred to as a telecom network. The general operations of these computer systems are known to persons of ordinary skills in the art. Only major system modules associated with the inventive system and method are discussed herein.

Task person T-person 8 is located at location TP-8a. Task person 8 carries with him or her a computer tablet 9 that has telecommunications link to Telecom Network A or Telecom Network B. Both smartphones 7 and computer tablet 9 and other GPS-enabled devices use a satellite supported global positioning signal (GPS) which is detected by devices 7, 9. The GPS signal is utilized by smartphone 7 and computer tablet 9 to mark its location and provide information to persons 6, 8.

These task persons may be required to visit equipment store 12 at location ST-a prior to visiting customer A at location A-1, customer B at location B-1 or any other customers. Customer A at location A-1 has a telephone 14 which is diagrammatically illustrated as being connected to the telecommunications network which includes Internet 10. Customer A also includes a computer 16 which is linked to a telecommunications network and ultimately to Internet 10. Telecom network A and telecom network B are either integral with Internet network 10 or can be effectively considered an extension of Internet 10 utilizing common telecommunications system such as land line, satellite and cellular telephone communications systems. Customer B has a service location at location B-1 but currently customer B is located in office building 18. Customer B carries with him smartphone 19. Office building 18 is at location B-2 which is distant from customer B location B-1. Therefore, when customer B who is carrying smartphone 19 needs to visit the service person or sales person at location B-1, the cell phone 19 of customer B should be utilized to arrange and coordinate the simultaneous visit of task person 6, 8 at location B-1 with customer B at location B-1. As discussed later, this coordination of both the service person or task person and customer B at distant location B-1 is accomplished.

Internet 10 or telecommunications network 10 is connected to System Operator I server 20. Server 20 includes a computer processor 22 and a memory system 24 and various input/output devices 26. These devices cooperate and permit Server I of System Operator I to communicate with database 128. Additionally, System Operator I server 20 utilizes telecommunications input/output module 30 to communicate with smartphones 7, 19 and tablet computer 9 as well as customer A computer 16 via Internet 10, telecommunications networks A and B. System Operator server I is further connected to a network 28 linking the server I to an administrator computer 30, a manager A computer 32, a manager B computer 34 and various task team members 36. Task team members 36 have team member smartphone TT-A and smartphone TT-B. Manager A also has his or her cell phone 31 and manager B has her cell phone 33. As described later in conjunction with the Tables 2A to 2K and Tables 3A to 3R, System Operator I server 20 can fully engage all the features of the present invention.

However, there is a distinct benefit in utilizing the present method and the computer system in a distributed manner such as a software as a service (SAAS). In this distributed computer system and method, the present invention utilizes a trusted third party (TTP) server system 38. TTP server 38 includes all the elements customarily found in computer systems including interactive voice response (IVR) module 40 and telecommunications input and output module 42. TTP server 38 interacts with a plurality of databases effectively isolating sensitive data from System Operator I in database system I-44 from the data from System Operator II and database II-46. Customer data of the trusted third party System Operator 38 is stored in TTP customer database 48. Of course, a singular database may be utilized and different portions of that database would hold the secure or secret information for System Operator I as compared with System Operator II and as further compared with TTP customer database 48.

Internet and telecommunications network 10 is also connected to System Operator III server 50. System Operator IV server 52 is further connected to the telecommunications network 10. System Operator IV has access to database system IV-54. System Operator IV utilizes its own telecom input and output 56 which generates satellite communications links to task person 4 who retains smartphone 5.

FIGS. 2A to 2K diagrammatically illustrate a number of tables having field identifiers which are useful for carrying out the basic elements of the present invention. In "activities today" table in FIG. 2A has data fields for the title of the activity, the user who is viewing the activity, the time of the activity as well as the work order (WO) task, customer in action. All these tables can be reconfigured to closely match the business of the System Operator.

The abbreviations used in the Tables and in FIG. 1 are sometimes identified in the Abbreviations Table at the end of this patent specification. Otherwise, abbreviations are identified in the description of the invention.

FIG. 2B shows a Customer's Table which includes name, address, primary contact at the customer location as well as action associated with the customer.

FIG. 2C is a work order WO Table which identifies: the type of file operative for the open work order, the customer, the customer location, the status of the work order, a date and time for the projected delivery of goods or services at the customer location, the task person, and a field for confirming whether the task person recognizes (ACK) the assignment or not and an action field.

FIG. 2D is a list of equipment necessary to provide the goods or services at the customer location.

FIG. 2E provides an outline for the work order reports. These reports are generated both prior to the work being delivered at the customer location and also while the task person is at the customer location. Identification of a function ("FNC") is also shown in the Table. For example, under the "create report" header, the function (fnc) is YES which, when activated from the user on the smartphone or the web based interface portal provided by the system operator, the user (task person) can select YES generate the report and the system will generate an electronic fix copy of the report. In the absence of selecting YES, the system does not create the report. Hence, the create report has a function as identified in the table.

It should be noted that many, if not all, of these Tables are fully reproducible on smartphones carried by the user or task person.

FIG. 2F is a short form balance sheet for a particular customer. FIG. 2 G is a "task table" that identifies: the file type, the identification number of the particular task, the status of the task (pending, closed, open), the category of the task, a task description, a "data action required" filed, and a "status" field.

FIG. 2H is a "user table" (a task person table) with a login identifier name, a status and an action required field.

FIG. 2I list a "partner" table. Partners are well established customers or suppliers. FIG. 2J is a table for "devices." Typically, "devices" listed in the Tables are the GPS-enabled electronic devices, cellphones, smartphones, computer tablets and other GPS-enabled devices, all of which include a telecommunications link FIG. 2K is a listing of the products.

FIGS. 3A-3R diagrammatically illustrate another group of tables which are partially complete and which represent a working embodiment of the present invention. FIGS. 3A-3R provide examples of the system. The system can be configured in various manners and the tables can be expanded or contracted to adapt to any particular business. However, FIGS. 3A to 3R represent at least one working embodiment.

FIG. 3A is a configured table showing the initial screen presented to the user who is logged in to the system. That screen includes four different sections a "new notifications" section, a "new-unassigned work order" section, an "assigned work order" section and an "activities today" section. This initial presentation can be altered by the user under his or her settings function. Under "new notifications, " the fields for the database or spreadsheet (a two dimensional database) include type, Id for the notification, date, description, a function enabling the user to view the entire alarm or notification record, a function to enable the user to accept the notification and another function to permit the operator to delete the notification record. The user may select to various functions and this is noted in these tables as "u-sel." Therefore, a notification is set for an "alarm" with a notification id record "123" and is set for date "Oct. 10, 2011." The event is a potential low battery on a particular GPS-enabled device. The user can view the entire record by selecting V (view), can accept the notification (ACC or ACK), or can delete the notification (del).

The "new-unassigned work orders" table is typically presented to managers of the System Operator. The identification and the title of the work order is provided in the far left column. The customer and a customer location listed in the next column. The status of the unassigned work order is open, pending or closed. Dates and actions are noted in the Table.

For "assigned work orders," again, the title and id of the work force is provided, the customer, status, date and task person assigned to the WO is listed. Preferably, the phone number of the task person is also provided. This data is part of the task person data collection maintained in one or more of the databases 28, 44, 46, 54 in FIG. 1. As an example of a particular layout, the user is presented with certain functions external to the table identified as "X-Table fnc" or "XT-fnc"). Therefore, with respect to new and unassigned work orders, the user can select "go to page 2" of the unassigned work order, "go to page 3," etc. With respect to assigned work orders, the external table function is abbreviated "XT-fnc." The "Activities today" Table is self explanatory.

If the user or System Operator selects a particular notification from the initial screen, a table such as FIG. 3B is generated by the processor server 20 or 38. It is well known that computer systems and, in particular, web based computer systems utilize servers to provide a data display screen which enables the user at computer tablet 9, smartphone 7 and computer 16 to respond and input data and manipulate data presented by the server. FIG. 3B shows a configured table for new and old notification. The type of notification and id of the notification is indicated as "alarm 123." This is the same "alarm 123" as identified in FIG. 3A. Therefore, FIG. 3B shows all the data collection or data record for that notification 123. The notification includes a message, the date the message was acknowledged (ACK), who acknowledged the message, a criticality indicator or alarm, a status of the notification, the creation date of the notification record, the date the notification was adequately responded to (closed date) and who closed the date. With respect to "status," the data may reflect and acknowledgment ack, a pending indicator or a field to delete or indicate NO.

FIG. 3C is a configured table which the user sees once he or she selects the assigned work order WO from the main menu of FIG. 3A.

With respect to FIGS. 3C to 3J, the same menu functions are provided along the top row of the screen enabling the user to select a folder or directory under: summary, equipment records, note records, documents, forms, activities, bills and history. These directories or file selections are underlined in FIG. 3C-3J. The folder which is underlined and shown in bold has been activated in the particular figure. Therefore, FIG. 3C is a summary of the assigned work orders ("summary" shown in bold print), FIG. 3D is the "equipment associated" with a particular record, FIG. 3E are "notes" assigned to a work order, FIG. 3F are "documents" available for that particular work order. FIG. 3G is "forms" associated with either the equipment or the service to be provided to the customer for that work order. FIG. 3H is an "activity log" for the work order. FIG. 3I shows the bills or accounting for a particular work order and FIG. 3J shows the history of that work order.

Returning to FIG. 3C, the "summary" of the work order includes fields for status, date created, customer, location, the task assigned person, the projected appointment data, an estimate of the duration of the service (time on site) regarding how long the service person or sale person will be at the customer location. A confirmed status field as well as various functional inputs are provided. These functional inputs include the ability of the user who is viewing the FIG. 3C "work order summary" to "input" data, "see more data" on a particular field, "mark as critical" certain fields and aspects and data in that table, "acknowledge" that the work was done and "input more" data.

FIG. 3C also lists the travel time and the time-on-site which is calculated and stored as discussed later herein.

FIG. 3D is an equipment table associated with the work order. The equipment table can be changed to reflect any particular information necessary about the equipment.

FIG. 3E is a "note" associated with a particular work order. In FIG. 3E, the user can pull down a list of personnel such as the task person, the manager, the system operator, administrator. That selected person cna then annotate the Notes record for the work order WO. Therefore, the task person and anyone associated with that work order, such as task team 36 or manager A32 or manager B34 or administrator 30 can annotate the "note" record associated with a particular work order.

FIG. 3F are the "documents available" and FIG. 3G are "forms available" to the person. FIG. 3H shows an activity log for a particular work order.

FIG. 3I shows a billing table for a particular work order. FIG. 3J shows an accounting history for that customer.

It is important to realize that task person 6 carrying smartphone 7 or task person 8 carrying computer tablet 9 can access this information in Tables 3A-3R both prior to beginning the drive to equipment store 12, to customer location A-1 or to customer location B-1. In this manner, the information stored in all these tables is transparent to the entire management team.

FIG. 3K shows a main menu listing four top level selections. In other words, the user, when viewing the main menu, can select home, customer, work orders, task, activity, account or help. Sub-file or folders are available under the "work orders" folder which include work orders, equipments and reports. Under the "reports" sub-folders, is a series of secondary sub-folders or sub-subfolders which include work orders, and balance sheets. Under "task," the sub-folders are task and reports. Under "activity," the sub-folders are schedule, notification (with sub-folders notifications, messages and alarms), locations (with sub-subfolders last known, task person time sheet, task person geographic path) and reports (sub-subfolders activity report). The account main folder includes sub-folders for user, partners, devices, products, setting, my settings, and administration. Many of these tables and data input screen are discussed earlier in connection with FIGS. 2A to 2K and 3A to 3R.

FIG. 3L shows a configured table for activity and schedule. The functions presented to the user include an option to select the daily time schedule for task person A, task B and task person C. Alternatively, the user can select a monthly calendar display. Additionally, the user may select all tasks assigned to a particular user or select "all users" by group name or select a user by smartphone or device. As stated earlier, the device is a listing of all the Internet and GPS-enabled devices carried by all task persons and managers administrators. Alternatively, the user can select the geographic device or group of geographic devices.

Under "display daily calendar" function, FIG. 3L has a vertical time blocks 8 AM, 8:30 AM and 9:00 AM extending down through the evening hours. The rows are identified by the Task Person A, B and C. If the user selects smartphone, the smartphone ids would be atop the column headers.

FIG. 3M is an "activity notification" Table which again shows a daily calendar identified by column headers for task person A, B and C. The user can select a single user in a monthly calendar display or all users in a daily calendar display as well as smartphone device or geographic or GPS-enabled device.

FIG. 3N is a last known location which displays a map with location points showing the last known location of a particular task person. The user can select smartphone in a group, or singular user with a smartphone as well as a GPS-enabled device or a group of GPS-enabled devices.

FIG. 3O is a location time sheet tracker. A display daily calendar shows task person A or task person smartphone or task person computer tablet with data filled in the row associated with a time block. Therefore, at 8:00 AM, task person A has data in their time block extending to 9:00 AM. Compared this data with the computer tablet listing only an 8:30 data entry. The user is permitted to select various users, groups or task persons or GPS-enabled devices.

FIG. 3P is a location and geographic tracker. This enables the user to select a task person, smartphone device, or various groups of devices. A map is displayed to the user and under the map is a critical marker Table identifying the critical nature of the task being reviewed. Maps from MapQuest™ or Google Maps may be used. Further, a status of the GPS-enabled device is shown. The status is idle, moving, or out of range. A total time of travel as well as a total of time on site is provided in this table.

The table beneath the geo tracking map also shows the start time as well as the time on site. An approximate distance to the customer location A-1 or B-1 is provided in this table.

FIG. 3Q discloses an activity Id, a user, customer and enables the user to input display or select calendar.

FIG. 3R discloses an "account" Table showing a sub-account for all users, partners, devices, products etc.

Details of the Movement and Idle Segmentation

Figure 4:
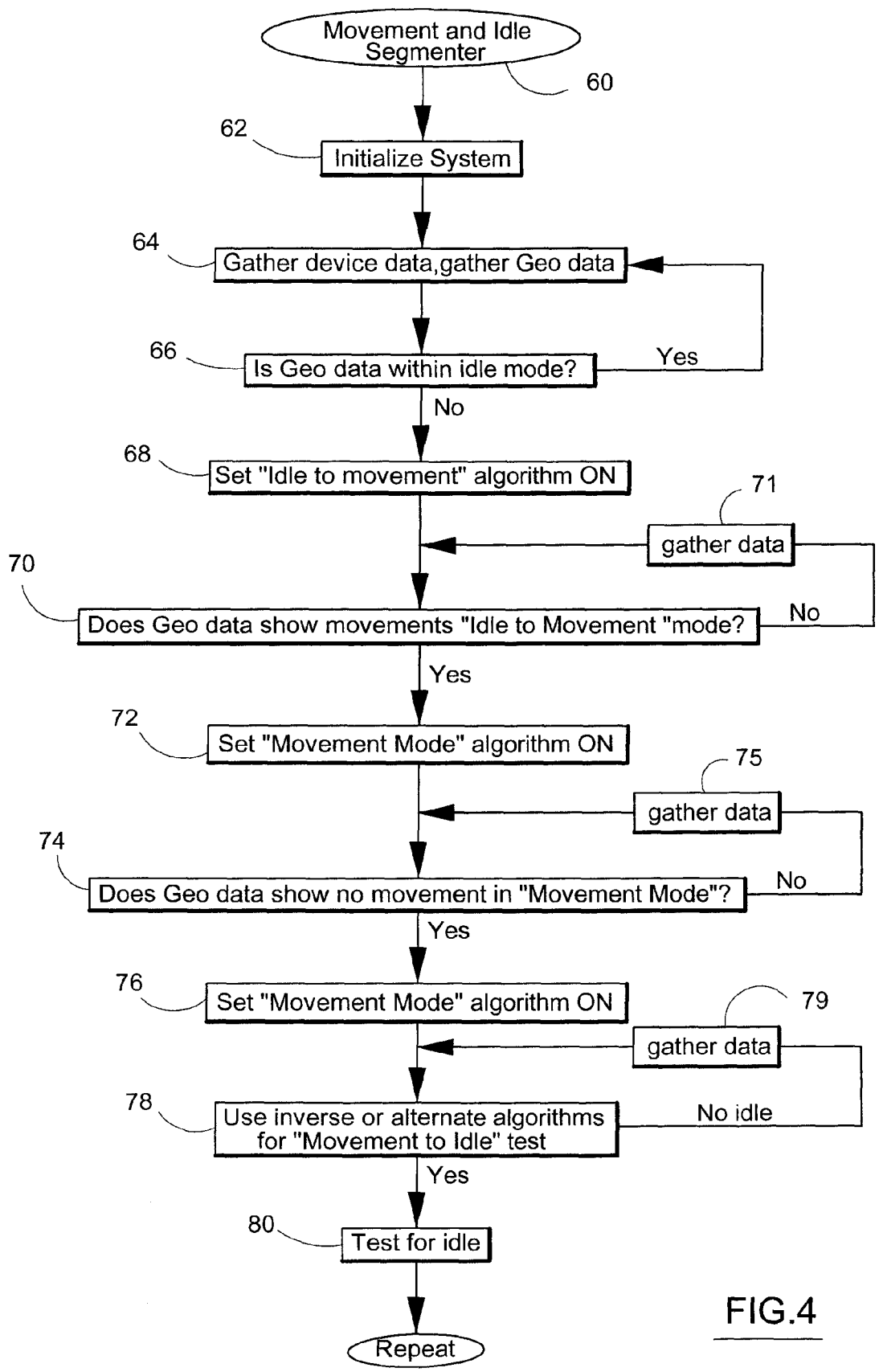
FIG. 4 diagrammatically illustrates the flowchart, routines and software modules for the movement and idle segmentor in accordance with the principles of the present invention.

FIG. 4 diagrammatically illustrates the movement and idle segmentor program in accordance with the principles of the present invention. In order to determine the travel time and provide travel time indicator data as well as on-site indicator data and time on site data, it is important to determine whether the GPS-enabled device is moving or is idle or at a singular general geographic location. The movement and idle segmentation routine 60 first initializes the system at step 62. In step 64, the system and primarily the web based process server gathers GPS data from smartphone 7, computer tablet 9 or smartphone 5 as well as id data indicating which one of the GPS-enabled devices is sending this information. Currently, GPS-enabled devices record a GPS signal in the memory of the smart phone or enabled device. The present system opens a telecommunications channel between one of the web processors 20, 30, 50, 52 and the GPS-enabled devices 7, 9, 5. Currently, every 6 seconds (as an example), the web based interface on the processor-server (for example 20, 38), requests that the GPS-enabled device 7, 9 upload the GPS location and time stamp data to the web based servers 20, 38. An interface portal to the Internet, and ultimately to the GPS device is enabled by the server 20, 38. Therefore, the servers accumulate this GPS location and time data and store the same in the appropriate database 28, 44, 46, 54. It is this data that is processed by the processors in servers 20, 30, 50, 52.

In step 66, a test is made of the data to determine whether the GPS-enabled device is in an "idle" mode. If YES, the program repeats to step 64. If NO, the system executes step 68.

Equation 1 and Alternate Equation 1 which follows describe two algorithms to determine whether the GPS-enabled device is in an idle mode.

TABLE

Equation 1

Eq. 1: Is the distance between
(centerpoint of p most recent geo.pts.)
and
(Centerpoint of n geo.pts.)
less than an Idle-Thresold value (where p is different than n)
If YES, then geo within Idle zone
wherein n > p
Alternate Eq. 1:
Obtain:
loc. at t1
loc. at t2
loc. at t3
Calculate centerpoint CP1 with loc. data at t1, t2, t3
Determine if loc. at time tk < (CP1 plus 25 meters)("25" = distance "D-idle")
If YES, update Centerpoint CPk, within idle zone.
If NO, execute next program step In Equation 1, the distance between two center points is compared. A center or "center point" is determined by taking a group of sequential geographic data and engaging an algorithm to determine the center of location of that aggregated geographic data. A center point CP of data group p for the most recently acquired geographic data is calculated. Also, a center point of a different group n of geographic data is created. The system determines the distance or difference between these center point data collections p and n. If the absolute value of the distance is less than an idle threshold value, then the system indicates that the GPS smartphone is in an idle mode. Generally, n geographic points is larger than p geographic points. With respect to alternate Equation 1, the location is obtained at times t1, t2 and t3. The center cp1 is computed. Of course, many more geographic points other than sequential times t1, t2 and t3 could be utilized. If the current location at time Tk is less than cp1 plus a predetermined value such as 25 meters called D-idle threshold, then the system determines that the smartphone is no longer in an idle mode. If the current geographic location is less than the cp1+distance threshold, the system notes that the smartphone is within the idle zone. If not, the system executes steps 68.

In FIG. 4, step 68 turns ON the "idle to movement" algorithm. The Equations 2A, 2B, 2C and 2D may be utilized in the "idle to movement" algorithm step 68.

TABLE

Equation 2

Eq. 2A Point to Point Velocity
Is velocity at each acquired geo. pt.
over time span (tspan1) increasing?
(geo at t1 less geo at t2)/(t2 less t1) = vel. t2
(geo at t2 less geo at t3)/(t3 less t2) = vel. t3
Is vel. t2 < vel. t3 < vel.t4 < vel.t5?
Eq. 2B Interval Velocity
Distance traveled over Z, one minute intervals
(geo at t1) less (geo at t1 plus 1 minute) = D-interval-1
(geo at t1) plus (geo at t1 plus 2 min) = D-interval-2
Is (D-interval-1) less (D-interval-2)/ (2 min) > a Velocity threshold
Then movement detected.
Eq. 2C Use center point data for "Point to Point" Vel and "Interval" Vel TABLE-continued Equation 2

Eq. 2D Use center point data for t period prior to "Mode ON," t1, t2, t3, t4 all antecedent times prior to "mode ON" then test for:
CP − geo at t "mode on 1" = D to CP1 note: distance to CP centerpoint
CP − geo at t "mode on 2" = D to CP2 etc.
If (D to CP 1) < (D to CP2) < (D to CP3) .... then "movement" detected Equation 2A is a point to point velocity equation wherein a velocity at each acquired geographic point over a certain time span is calculated. The velocity over t1 to t2 is obtained and compared with the velocity of t2 to t3. If the velocity at various time spans is increasing such as the velocity between time t1 and t2 and the velocity between times t2 and t3 and the velocity times t3 and t4 and the velocity between times t4 and t5 is increasing, then step 68 determines that the GPS-enabled device is showing "movement" as noted in step 70. The YES branched is then taken from step 70.

Equation 2B is an interval velocity calculation which looks at the velocity between two non sequential time data points. These non sequential data points are called d-interval-1 and d-interval-2. The distance between these two intervals is calculated and is divided by the time period of the time stamp for location at t1 as compared with the time stamp for a time at the predetermined interval t2. If the velocity is greater than a velocity threshold value, then "movement" is detected in step 70.

In Equation 2C, a center point data is utilized for the sequential time intervals and for the interval velocity shown in Equations 2A and 2B.

Equation 2D uses the center point data for a time period prior to "mode ON." Data from antecedent time t1, t2, t3, t4 (antecedent to "mode ON") is gathered prior to the time when the system detected the "idle to movement" ON. A test is made from the center point of that antecedent data to when the geographic data for the "mode ON" is detected. The resultant is a distance currently detected as compared with the previous center point distance CP1. The next calculation determines the center point of the current data group (not the antecedent data group) to determine the distance between the first center point and the post "mode on" data. The resultant is the distance to CP2. If the distances from the first center point as compared to the distance to the second center point are increasing then movement is detected.

Returning to FIG. 4, if movement is detected in step 70, the YES branch is taken and the system executes step 72 which turns ON the "movement mode" algorithm. Equations 3, 3A, 3B and 3C show examples of a "movement mode" algorithm. Step 74 enables processing of one or more of these algorithms to determine whether the GPS-enabled device is being moved.

In Equation 3, the velocity is calculated between two times, t1 and t2. A threshold is used in the system (set) and the system determines whether the velocity exceeds a human walking speed threshold. The human walking is typically 5 kph (3 mph). If the velocity at two time periods t1 through t2, t2 to t3, is greater than the human walking speed, the "movement mode" is turn ON. In Equation 3A, a further velocity check is conducted by the system. If the GPS-enabled device is moving faster than 16 kph (10 mph), the system is still determining that the GPS-enabled device is moving.

Equation 3B is a determination of two velocities over two different time frames. The velocity at t1 through t2 as compared to the velocity at t3 trough t4. Further, if a differences in velocities exceed a threshold V differential, then the system continues to determine that the "movement mode" is ON for that particular GPS-enabled device. Equation 3C utilizes algorithm with distance traveled data per a predetermined time frame and also and antecedent distance and velocity and a post-modal distance and velocity, all as compared with a more recent time interval.

Several algorithms could be utilized and the equations presented herein are only examples. If the GPS is still moving, the YES branch is taken and the system in step 76 sets the "movement to idle" algorithm ON. The "movement to idle" algorithm is the inverse of the "idle to movement" algorithm executed in connection with step 68, that is, Equation 2. In step 78, this inverse algorithm is used for the "movement to idle test." If no "movement to idle" outcome is noted by the equations and algorithms, the step continues to gather data as noted in step 79.

If the YES, branch is taken indicating that the GPS device is slowing to an idle, the system executes steps 80 which tests for the "idle" mode. This is noted in Equation 1 above.

It should be noted that since the system has data indicating the location of Customer A location A-1 as compared to customer B location B-1, and the system further continuously accepts GPS signal data from the smartphone devices carried by the task person, it is easy to determine when the task person arrives at customer location A-1 as compared to customer location B-1. A simple match achieves this "at location" test. However, the system also computes on a regular basis the travel time from location TP-6*a*, which is the initial location of smartphone 7, to customer location A-1. This travel time is logged into either the summary of the assigned work order table in FIG. 3C as time traveled field (which may require an additional field in Table 3C). The time traveled field may also be utilized in FIG. 3P as the location geo tracker. Additionally, the actual distance traveled by the task person 6 from the location TP-6*a* to location A-1 can be calculated. These distance calculations are provided by other algorithms known to persons of ordinary skills in the art. Since the system also detects "time at idle" position, a "time on site" calculation can be calculated from the idle data. The time on site is simply the time in the idle mode after smartphone 7 GPS location matches customer location A-1. The idle time is accumulated and calculated and ultimately posted in work order menu FIG. 3C and in location geo tracker display FIG. 3P when the smartphone leaves the "idle mode" state and enters the "idle to movement" state. However, the true test of when the smartphone and the task person leaves customer location A-1 occurs after the customer location match and after the "idle to movement mode" is detected and when the smartphone is in the "movement" mode. When this "movement" mode is detected, the system notes the time and calculates the "time on the site" and fills the data field in FIG. 3C as well as the time on site field in FIG. 3P.

As a result, the billing and accounting or back office program for the present invention can calculate the profit and loss ratio for the projected service time at location A-1 or the amount of face time the task person 6 spent at customer location A-1. Further, an analysis can be made of the travel time from tp6*a* to location A-1. Since the billing cycle and the travel time and the time on site is all integrated ultimately into the profit margin of the business, this information is of high value to both the managers, the team members, and the system administrator.

Figure 5:
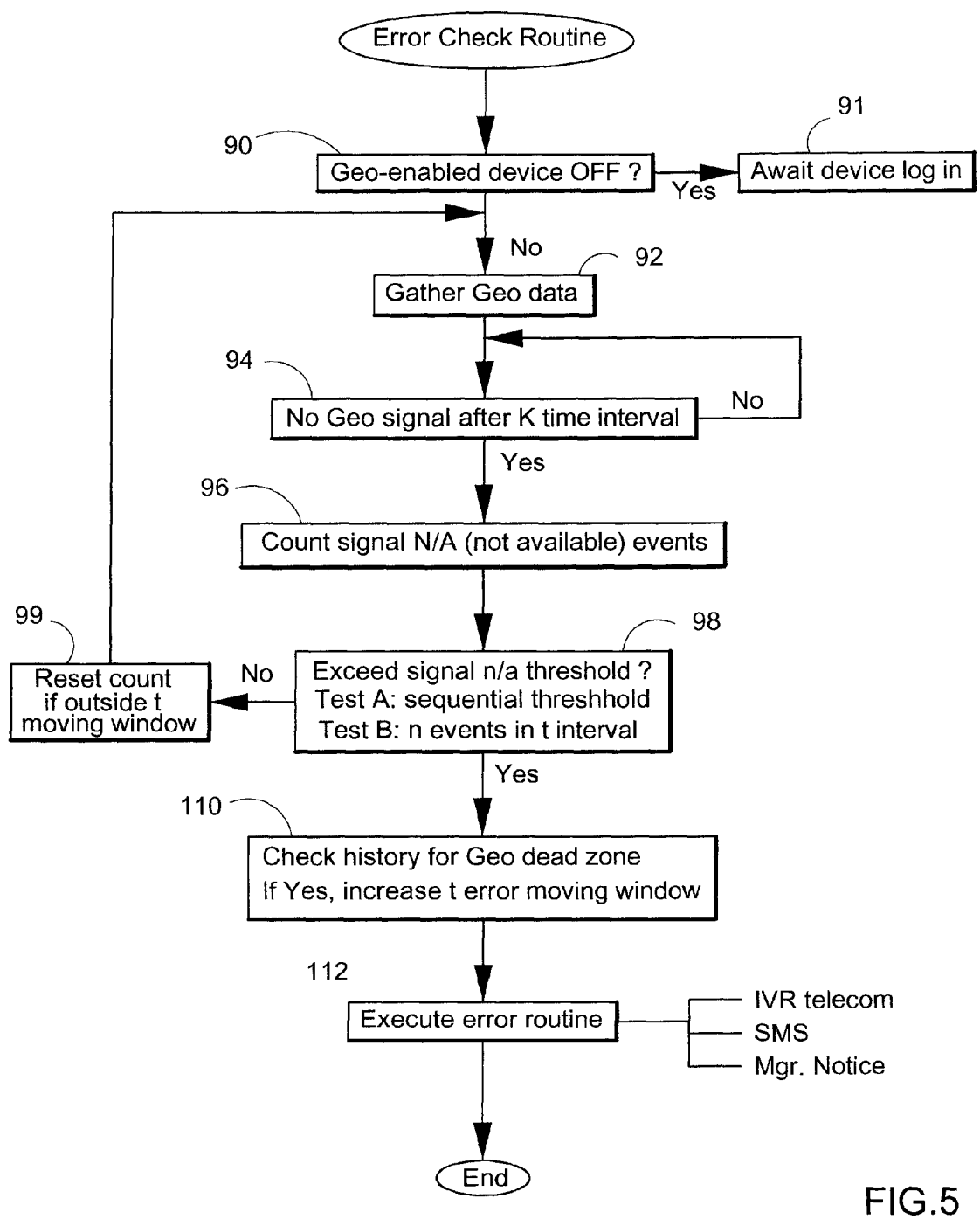
FIG. 5 diagrammatically illustrates a flowchart showing one implementation of the error checking routine.

There are certain errors involved in capturing this GPS data from GPS-enabled devices. From a statistical standpoint, the captured GPS signals are sometimes classified as random signals. For example, the GPS data acquisition can be interrupted by a poor telecommunications channel, a lack of cell phone coverage, and a lack of GPS signal reception by the smartphone or GPS-enabled device. The system could employ a simple error checking routine as noted in FIG. 5 or may use noise reduction algorithms or other statistical processes to better quantify the current GPS location. Also, the system may include historic data showing "dead spots" where GPS signals are not particularly strong or are adversely effected by buildings or ground terrain features (mountains, canyons, tunnels, etc.). A predictive routine would note a pattern of past GPS acquisition "errors" or gaps and then apply an estimation algorithm to locate the GPS enabled device based upon probability. Outside of the area of uncertainty (the area adversely effecting the GPS signals), the probability routine would be turned OFF. Therefore, FIG. 5 shows an error checking routine which is an example of at least one method to recognize these errors. In step 90, a determination is made whether the geo enabled device if OFF. If YES, the system waits until the device logs-in in step 91. If NO, meaning that the geo enabled device is ON and logged in, the system executes step 92 which gathers the geographic time stamp location data from the smartphone. In step 94 the system determines whether there has been no GPS signal after a certain time interval K. If NO, the system loops back to gather step 92. If YES, the system executes step 96 which counts the signal "not available" (n/a) time events. In a 6 second cycle, three n/a counts are logged in a 20 second time interval. In step 98 the system determines whether the n/a GPS count exceeds a threshold value. One error is whether sequential acquisition times t1, t2, t3 have been missed (three n/a counts in 20 sec). In the present working embodiment, the system gathers GPS signal every 6 seconds. If the signal is not received by the process server for 1 minute, this is 10 unit time interval, equal to 10 n/a counts. Test A in step 98 may be met that if the GPS signal has not received four 10 sampling times (represented 1 minute) the YES branch is taken. Test B in step 98 determines whether there has been an n number of n/a events within a certain time interval T-error. In other words, if there are 6 non available GPS signal events within a five minute T-error time period, the system is programmed to generate a YES indicator from step 98. If the signal n/a threshold has not been met, the NO branch is taken and in step 99 the system resets the n/a signal count if the oldest n/a signal count falls outside of the moving time interval window. The system returns to gather geo data step 92.

If the GPS n/a signal threshold has been exceeded, the YES branch is taken from step 98 and the system in step 110 checks the history of all of the GPS-enabled device to determine whether the current or last confirmed GPS signal is within a "geo dead zone." If a history for a plurality of GPS-enabled devices shows that there is a geographic dead zone in or near the current location, the YES branch is taken and the time interval is expanded for the n/a threshold task 98. By expanding the time threshold in step 98, the system looks for a greater number of n/a events to better track the current GPS location. If history does not indicate a geographic GPS dead zone, the system executes step 112 which institutes an error routine.

The error routine may involve an interactive voice response or IVR telephone call to the smarphone 7 of task person 6, a short message service sms to smartphone 7 or a notice to a manager A32. Other error routines could be utilized.

Once an error is noted, the type of error and the degree of Sys. Op. notification should be posted in Table FIG. 3B. In this manner, the type of error and any corrective steps may be taken by the Sys. Op. manager or other supervisor.

Figure 6:
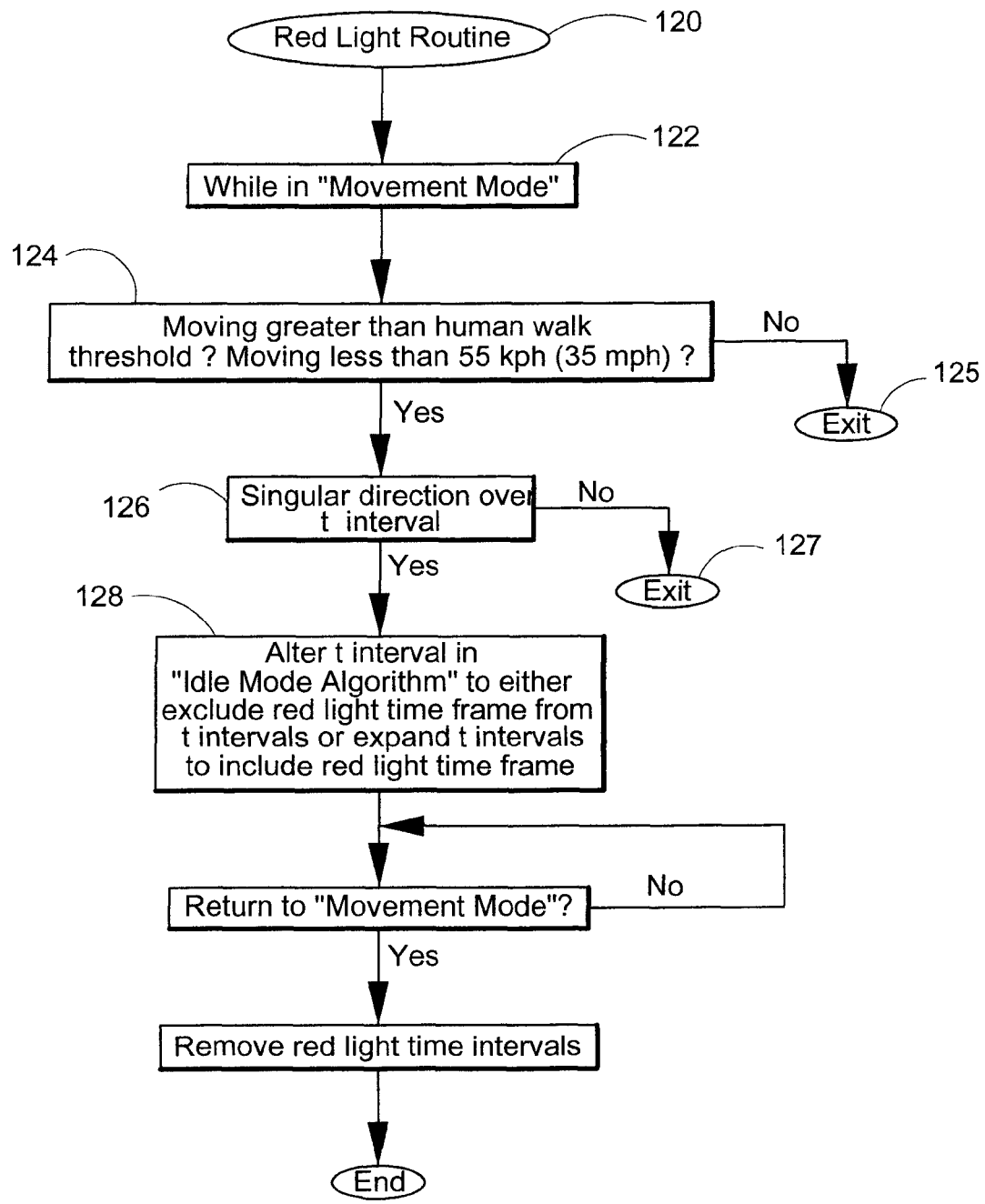
FIG. 6 diagrammatically illustrates a example of a flowchart for a red light routine which alters the idle mode algorithm.

FIG. 6 diagrammatically illustrates a red light routine 120 which supplements the idle mode routine. In step 122, a determination is made that the system and the monitor GPS device is in a movement mode. In step 124, a determination is made whether the GPS device is moving greater than a human walk threshold and is moving less than 55 kph (35 mph). If not, the system exist the program at step 125. The reason for testing for "greater than walk" speed and the "less than 55 kph" is that in city traffic, the typical vehicle speed between traffic lights on a city road is greater than a human walk speed (5 kph) and is less than the 55 kph speed. If YES, the system executes step 126 which determines whether the GPS device is moving in a singular direction over a certain t time interval. This is a directional test of sequential data. If not, the system executes at step 137. If YES, the system executes step 128 which alters the time intervals in the idle mode algorithm to either exclude red light time frame from the time interval or expand the time intervals to include the red light time frame. In other words, if the task person 6 is stopped at a red light, the system adapts to expand the time frame to determine when the system and the GPS device is in idle mode. The red light time frame can be obtained by the local jurisdiction based on traffic patterns.

Description of Typical System Features

The present invention relates to an enhanced mobile workforce planner and tracker deployed over GPS-enabled devices and enabling access to workforce data via computer systems, over the Internet and on a computer network (LAN or WAN), and computer programs, computer modules and information processing systems to accomplish these planning and tracking services.

It is important to know that the embodiments illustrated herein and described herein below are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The present invention could be produced in hardware or software, or in a combination of hardware and software, and these implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk, as would be known to one of ordinary skill in the art. Further, the program, or components or modules thereof, may be downloaded from the Internet of otherwise through a computer network.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

In the drawings, and sometimes in the specification, reference is made to certain abbreviations. The following Abbreviations Table provides a correspondence between the abbreviations and the item or feature.

| Abbreviations Table | |
|---|---|
| Admin | Administrator |
| ap | an access point |
| API | application program interface |
| ASP | application service provider - server on a network |
| bd | board |
| comm. | communications, typically telecommunications |
| comp | computer with Internet access |
| comp-tbl | computer tablet with GPS and telecom link |
| CPU | central processing unit |
| db | data base, may also refer to a spreadsheet (a two-dimensional database) |
| Disp | display or code |
| doc | document |
| dr | drive, e.g., computer hard drive |
| Equip | equipment |
| fnc | function such as V = View, ACC = Accept task; DEl = delete entry; ACK = acknowledge receipt of comm. |
| Geo | geographic location or data (geo.loc. is GPS data) |
| GPS | geo positioning system and location (optionally time data) |
| HR | human resources or regional manager |
| I/O | input/output |
| Int | Internet network (part of the telecom network) |
| loc | location |
| loc. ptr. | displayed location on a displayed map |
| mem | memory |
| Mess | message as in SMS or text message |
| mgr. | manager in the Sys Op administration |
| ntwk | network |
| pend | pending, such as a posted task, not yet completed |
| pgm | program |
| proc | processor, as in computer processor |
| Pty | party, as in Trusted $3^{rd}$ Party ("TTP") |
| P/W | password |

-continued

Abbreviations Table

| | |
|---|---|
| Rcd | database record or record profile |
| re | regarding or relating to |
| Reg'd | registered as in Reg'd Pro, Registered Provider |
| rel | release |
| req | request |
| rev | review |
| Rpt | Report |
| rt | real time, may include day and time stamp data |
| sec | security |
| Sel | select |
| sm-ph | smart cellphone with GPS |
| SR | sales representative |
| sys | system |
| Sys Op | System Operator |
| t | time, sometimes refers to day and date and time of day |
| T-person | task person who is assigned a task |
| Tbl | table, may be configured as a database or spreadsheet |
| telecom | telecommunications system or network |
| URL | Uniform Resource Locator, or other network locator |
| u-sel | User selects function |
| WO | work order |
| X-tbl | a selectable user function displayed beyond the grid line of the data table |

The claims appended hereto are meant to cover modifications and changes within the scope and spirit of the present invention.

What is claimed is:

1. A computer-based method to convert GPS signal data from a GPS-enabled cellular phone, tablet computer or electronic device into travel time indicator data and on-site indicator data, the method operative with a database populated with task person data representing at least contact data for that task person, and data representing a plurality of task situs locations and tasks, said database coupled to a web-based processor which in turn is coupled to a telecommunications network, said GPS-enabled device coupled to said telecommunications network, the method comprising:

periodically gathering substantially in real time GPS time stamped location data from said GPS-enabled device adapted to be used by said task person via a web-based communications channel between said web-based processor and said GPS-enabled device;

determining when said GPS-enabled device is in an idle mode defined by a territory about a present GPS location data by monitoring a distance threshold;

determining whether said GPS-enabled device moves by application of an idle-to-movement algorithm comparing one or both of a series of earlier positions and the velocity of movement;

determining whether said GPS-enabled device is in a movement mode by monitoring one or more of a distance traveled over a predetermined time period, a velocity at predetermined time intervals and a change in velocity;

determining whether said GPS-enabled device moves by application of a movement-to-idle algorithm comparing one or both of a recently acquired series of earlier positions and the recently resulting velocity of movement;

calculating a time-on-site when the idle mode is ON and the then current GPS location data matches said task situs location data until the next movement mode is detected;

calculating the travel time between adjacent ones of said plurality of tasks within a defined work period;

calculating a projected time of arrival based upon at least the task person's current location data and said task situs location data;

calculating the distance to said task situs based upon the task person's current location data and the task situs location data;

notifying, via voice, text, email or interactive voice response message, one or more from the group of: (i) a task person coordinator, (ii) task person, (iii) task person manager or (iv) customer, of one or the other: (a) said time-on-site at the task situs location and (b) said travel time between time adjacent ones of said plurality of tasks;

generating displayable data for a customer's Internet-enabled device of one or both of (a) said projected time of arrival and (b) said distance to said task situs; and when said customer is not at said task situs, generating further displayable data to said customer Internet-enabled device of one or both of (a) an updated projected time of arrival and (b) an updated task person distance to said task situs, thereby effecting coordination of a substantially simultaneous visit of said task person and said customer at said task situs.

2. A method as claimed in claim 1 wherein determining said idle mode includes combining earlier GPS location data and comparing the resultant to said distance threshold.

3. A method as claimed in claim 2 including storing said time-on-site data in the corresponding task data collection.

4. A method as claimed in claim 1 wherein the method includes calculating the travel time includes the time period from (a) the idle-to-movement time data point immediately after the task situs location and GPS match to (b) the next sequential task situs location and GPS match from the next sequential unique task data collection.

5. A method as claimed in claim 4 including storing said travel time data in the corresponding task data collection.

6. A computer-based method to convert GPS signal data from a GPS-enabled cellular phone, tablet computer or electronic device into time-on-site indicator data, the method operative with a database populated with task person data representing at least contact data for that task person, and data representing a plurality of task situs locations and tasks, said database coupled to a web-based processor which in turn is coupled to a telecommunications network, said GPS-enabled device coupled to said telecommunications network, the method comprising:

periodically gathering substantially in real time GPS time stamped location data from said GPS-enabled device adapted to be used by said task person via a web-based communications channel between said web-based processor and said GPS-enabled device;

determining when said GPS-enabled device is in an idle mode defined by a territory about a present GPS location data by monitoring a distance threshold;

determining whether said GPS-enabled device moves by application of an idle-to-movement algorithm comparing one or both of a series of earlier positions and the velocity of movement;

determining whether said GPS-enabled device is in a movement mode by monitoring one or more of a distance traveled over a predetermined time period, a velocity at predetermined time intervals and a change in velocity;

determining whether said GPS-enabled device moves by application of a movement-to-idle algorithm comparing one or both of a recently acquired series of earlier positions and the recently resulting velocity of movement;
calculating a projected time of arrival based upon at least the task person's current location data and said task situs location data;
calculating the distance to said task situs based upon the task person's current location data and the task situs location data;
calculating a time-on-site when the idle mode is ON and the then current GPS location data matches said task situs location data until the next movement mode is detected;
notifying, via voice, text, email or interactive voice response message, one or more from the group of: (i) a task person coordinator, (ii) task person, (iii) task person manager or (iv) customer, said time-on-site at the task situs location;
generating displayable data for a customer's Internet-enabled device of one or both of (a) said projected time of arrival and (b) said distance to said task situs; and
when said customer is not at said task situs, generating further displayable data to said customer of one or both of (a) an updated projected time of arrival and (b) an updated task person distance to said task situs, thereby effecting coordination of a substantially simultaneous visit of said task person and said customer at said task situs.

7. A method as claimed in claim 6 wherein determining said idle mode includes combining earlier GPS location data and comparing the resultant to said distance threshold.

8. A method as claimed in claim 7 including storing said time-on-site data in the corresponding task data collection.

9. A method as claimed in claim 7 wherein the method including calculating the travel time between time adjacent ones of said plurality of tasks within a defined work period by calculating the time period from (a) the idle-to-movement time data point immediately after the task situs location and GPS match to (b) the next sequential task situs location and GPS match from the next sequential unique task data collection.

10. A method as claimed in claim 9 including storing said travel time data in the corresponding task data collection.

11. A computer system converting GPS signal data from a GPS-enabled cellular phone, tablet computer or electronic device into time-on-site indicator data, a web-based server coupled to a telecommunications network and further coupled to said GPS-enabled device, said server maintaining a database populated with task person data representing at least contact data for that task person and task situs location data, comprising:
a web-based interface on said server and in communication with said GPS-enabled device, said interface periodically gathering GPS time stamped location data from said GPS-enabled device adapted to be used by said task person;
said server having an idle mode means for determining when said GPS-enabled device is in an idle mode defined by a territory about a present GPS location data by monitoring a distance threshold;
said server having an idle-to-move means for determining whether said GPS-enabled device moves by application of an idle-to-movement algorithm comparing one or both of a series of earlier positions and the velocity of movement;
said server having movement mode means for determining whether said GPS-enabled device is in a movement mode by monitoring one or more of a distance traveled over a predetermined time period, a velocity at predetermined time intervals and a change in velocity;
said server having a move-to-idle means for determining whether said GPS-enabled device moves by application of a movement-to-idle algorithm comparing one or both of a recently acquired series of earlier positions and the recently resulting velocity of movement; and
a processor to calculate a time-on-site when the idle mode is ON and the then current GPS location data matches said task situs location data until the next movement mode is detected;
means for calculating the travel time as travel time data between time adjacent ones of said plurality of tasks within a defined work period by calculating the time period from (a) the idle-to-movement time data point immediately after the task situs location and GPS match to (b) the next sequential task situs location and GPS match from the next sequential unique task data collection;
means for calculating a projected time of arrival based upon at least the task person's current location data and said task situs location data;
means for calculating the distance to said task situs based upon the task person's current location data and the task situs location data;
said server having a communications module transferring substantially real time data representative of said GPS time stamped location data from said GPS-enabled device used by said task person;
said server having a further communications module transferring said travel time data to one or more from the group of: (i) a task person coordinator, (ii) task person, (iii) task person manager or (iv) customer;
means for generating, in a first instance, displayable data for a customer's Internet-enabled device of one or both of (a) said projected time of arrival and (b) said distance to said task situs; and
said means for generating, in another instance, updated displayable data to said customer Internet-enabled device of one or both of (a) an updated projected time of arrival and (b) an updated task person distance to said task situs, thereby effecting coordination of a substantially simultaneous visit of said task person and said customer at said task situs while said customer is in transit.

12. A computer system as claimed in claim 11 wherein said idle means determines said idle mode by combining earlier GPS location data and comparing the resultant to said distance threshold.

13. A computer system as claimed in claim 12 includes a data storage for storing said time-on-site data.

14. A computer system as claimed in claim 11 wherein said computer system is a distributed computer system, wherein:
said server includes said idle mode means, said idle-to-move means, said movement mode means and said move-to-idle means;
said distributed computer system including a supplemental computer having a supplemental database populated with said task person data;
said server having an additional communications module transferring real time data representative of said GPS time stamped location data from said GPS-enabled device used by said task person to said supplemental database.

15. A distributed computer system as claimed in claim 14 wherein the supplemental database is further populated with task situs location data, and the additional communications module of said server updates time-on-site data in said supplemental database when the idle mode is ON and the then current GPS location data matches said task situs location data.

* * * * *